(12) United States Patent
Cooke (10) Patent No.: US 10,405,523 B1
(45) Date of Patent: Sep. 10, 2019

(54) ILLUMINATED DOG WASTE COLLECTION TOOL

(71) Applicant: Alexander Cooke, Woodstock, GA (US)

(72) Inventor: Alexander Cooke, Woodstock, GA (US)

(*) Notice: Subject to any disclaimer, the term of this patent is extended or adjusted under 35 U.S.C. 154(b) by 0 days.

(21) Appl. No.: 16/220,205

(22) Filed: Dec. 14, 2018

Related U.S. Application Data (60) Provisional application No. 62/622,261, filed on Jan. 26, 2018.

(51) Int. Cl.
| | |
|---|---|
| *E01H 1/12* | (2006.01) |
| *A01K 23/00* | (2006.01) |
| *F21Y 115/10* | (2016.01) |
| *F21W 131/30* | (2006.01) |

(52) U.S. Cl.
CPC .... *A01K 23/005* (2013.01); *E01H 2001/1266* (2013.01); *E01H 2001/1286* (2013.01); *F21W 2131/30* (2013.01); *F21Y 2115/10* (2016.08)

(58) Field of Classification Search
CPC ............... A01K 23/005; E01H 1/1206; E01H 2001/1266; E01H 2001/1286; E01H 2001/1293; F21Y 2115/10; F21W 2131/30
USPC ........................................................ 294/1.5
See application file for complete search history.

(56) References Cited

U.S. PATENT DOCUMENTS

| | | | | |
|---|---|---|---|---|
| 4,852,924 A | * | 8/1989 | Ines | A01K 23/005 294/1.5 |
| 7,484,859 B1 | * | 2/2009 | Burke | A47L 13/52 15/257.1 |
| 8,146,967 B1 | * | 4/2012 | Brown | A01K 23/005 294/1.5 |
| 8,544,907 B2 | * | 10/2013 | Powell | A01K 23/005 294/1.5 |
| 9,131,661 B2 | * | 9/2015 | Spandau | A01K 23/005 |
| 9,420,762 B2 | * | 8/2016 | Brasuel | A01K 23/005 |
| 2009/0096227 A1 | * | 4/2009 | Pender | A01K 23/005 294/1.5 |
| 2015/0115634 A1 | * | 4/2015 | Young | E01H 1/1206 294/1.4 |
| 2015/0299970 A1 | * | 10/2015 | Krause | E01H 1/1206 362/253 |

* cited by examiner

*Primary Examiner* — Dean J Kramer
(74) *Attorney, Agent, or Firm* — Keeley DeAngelo LLP; W Scott Keeley (57) ABSTRACT

An apparatus for holding a bag open at the end of a telescoping handle. The apparatus includes an elastomerically coated, illuminated ring for releasably holding a bag while collecting dog waste before it reaches the ground. Additional features include a clip or clamp to hold a full bag of dog waste to carry it away for proper disposal.

10 Claims, 12 Drawing Sheets

ILLUMINATED DOG WASTE COLLECTION TOOL

TECHNICAL FIELD

The invention relates in general to dog-waste collection tools, methods and apparatuses, and specifically to dog-waste bag holders for collecting waste before it lands on the ground.

BACKGROUND

Dog droppings are known pathogen-carriers, potentially spreading fecal coliforms like *E. coli, Toxocara canis* and *Neospora caninum* helminth parasites. Although a single dog's droppings may not amount to a measurable environmental threat, the cumulative effect of dogs in a metropolitan area can contaminate soil and water supplies. Of particular concern is runoff from neglected pet waste contaminating water in storm drains that lead to wetlands and watersheds.

Dog waste is commonly collected with scoops, small shovels, rakes and bags. Other methods and apparatuses include a bags mounted to tools that scoop waste. Some tools are designed to be held under a dog's hind quarters while the dog defecates, catching the waste before it lands on the ground.

Light Emitting Diodes (LEDs) are a light source that requires very low voltage and can be configured to generate little heat. An LED is a two-lead semiconductor light source that releases energy in the form of photons when a suitable voltage is applied to the two leads. Other low-voltage light sources include electroluminescent wire, referred to as glow wire. Electroluminescent wire is a thin copper wire coated with phosphor which glows when an alternating current is applied to the wire.

Thermoplastic elastomers (TPE) are a class of copolymers, commonly a mix of plastic and rubber. TPEs consist of materials with both thermoplastic and elastomeric properties and therefore are also referred to as castable elastomers. Castable elastomers may be injection-molded to conform to complex shapes, and to form textures for gripping objects without adhesive.

SUMMARY

An apparatus is disclosed for holding a bag open at the end of a telescoping handle. The apparatus includes an illuminated ring with an elastomeric coating. The ring releasably holds the bag, which collects dog waste as it is excreted and before it touches the ground. Particularly at night, an illuminated ring helps in positioning the bag for collecting the dog waste. Additional features include a clip for holding a full bag while carrying the bag to a location for proper disposal.

In some embodiments a ring that is between 3.5" and 6" in diameter provides a housing for an array of low-voltage lights. An array of LEDs is one method of providing low-voltage light in a circular pattern. One skilled in the art understands that other methods may also be employed to illuminate a ringed form, including electroluminescent wire or the like. The housing has a lens on the top surface. The lens is covered with a castable elastomeric material having a texture suitable for gripping a plastic bag in a sheer direction sufficiently to hold the bag when draped over the ring, while releasing the bag when peeled away.

In one embodiment a telescoping handle has a proximal end with a switch in the handle's grip, and a distal end having a stationary portion of a hinge. The opposing portion of the hinge is affixed to the illuminated ring, lens and castable-elastomer combination. This combination is also referred to as an illuminated bag-holding ring. The hinge is offset so that the illuminated bag-holding ring folds parallel to the telescoping handle when the handle is retracted. When the telescoping handle is extended and held at a comfortable distance for use, the illuminated bag-holding ring may be unfolded to an angle that is substantially parallel to the ground. A power source is located proximal to the ring and offset hinge and powers the array of low-voltage lights. The switch in the proximal end of the telescoping handle regulates power to the low-voltage lights in the illuminated ring. A bag clip is affixed to a portion of the illuminated bag-holding ring and is used to hold the bag of waste once the apparatus is folded after use.

A method for collecting dog waste with an illuminated bag-holding ring is as follows. The user inserts a bag in the illuminated bag-holding ring and extends the handle. The illuminated bag-holding ring is rotated about the hinge to a position that is substantially parallel to the ground while the telescoping handle is extended to meet the reach of the user. The bag and illuminated bag-holding ring are held behind the dog, the switch in the handle is engaged, and the light helps the user position the bag. As the dog defecates, the droppings are caught in the bag. The bag is then peeled away from the elastomeric ring and clipped to the bag clip as the ring is folded about the collapsed telescoping handle. At that point the waste can be carried away for proper disposal.

In another embodiment a ring that is between 3.5" and 6" in diameter provides a housing for an array of low-voltage lights. The housing has a lens on its top surface. The lens is coated with a castable elastomeric material that has a texture suitable for gripping a plastic bag in a sheer direction to hold the bag when draped over the ring, while allowing the bag to be released when peeled away.

In this embodiment, the telescoping handle has a proximal end with a grip, and a distal end having a stationary portion of a hinge. The opposing portion of the hinge is affixed to the illuminated ring, lens and castable-elastomer combination, also referred to as illuminated bag-holding ring. The hinge is offset so that the illuminated bag-holding ring folds parallel to the telescoping handle when the handle is retracted. When the telescoping handle is extended and held at a comfortable distance for use, the illuminated bag-holding ring may be unfolded to an angle that is substantially parallel to the ground. The array of low-voltage lights are powered by a power source proximal to the ring and offset hinge. A switch is positioned in the offset hinge such that a portion of the hinge engages the switch when the illuminated bag-holding ring is rotated about the hinge to the intended position for use; it is disengaged when the illuminated bag-holding ring is rotated away from the angle intended for use. The illuminated bag-holding ring may then be folded against the collapsed, telescoping handle. Affixed to a portion of the illuminated bag-holding ring is a clip meant to hold the bag of waste. In other embodiments a bag may be held against the illuminated bag-holding ring by the pinching the bag between a portion of the offset hinge and the collapsed, telescoping handle.

A method for collecting dog waste with an illuminated bag-holding ring of the later embodiment is as follows. The user inserts a bag in the illuminated bag-holding ring and extends the handle. The illuminated bag-holding ring is rotated about the hinge to a position that is substantially parallel to the ground while the telescoping handle is extended to meet the reach of the user. As the illuminated bag-holding ring is rotated, the switch is activated as it meets the hinge, turning on the lights. Thus illuminated, the apparatus is held at the dog's hind-quarters as it defecates, and the droppings are caught in the bag. When the dog is finished the dog-owner grasps and gathers up the bag's edges, and then clips the bag-edges to the clip next to the ring. The user may collapse the telescoping handle and fold the ring with it.

With the dog-waste bag gathered and clipped, and the apparatus folded, the dog-owner can carry the waste away for disposal.

Other objects and features will become apparent from the following detailed description considered with the accompanying drawings. The drawings are meant to illustrate, not limit, the invention.

BRIEF DESCRIPTION OF THE DRAWINGS

To assist those of skill in the art in making and using the disclosed system and method, reference is made to the accompanying figures, wherein.

DESCRIPTION

Figure 1:
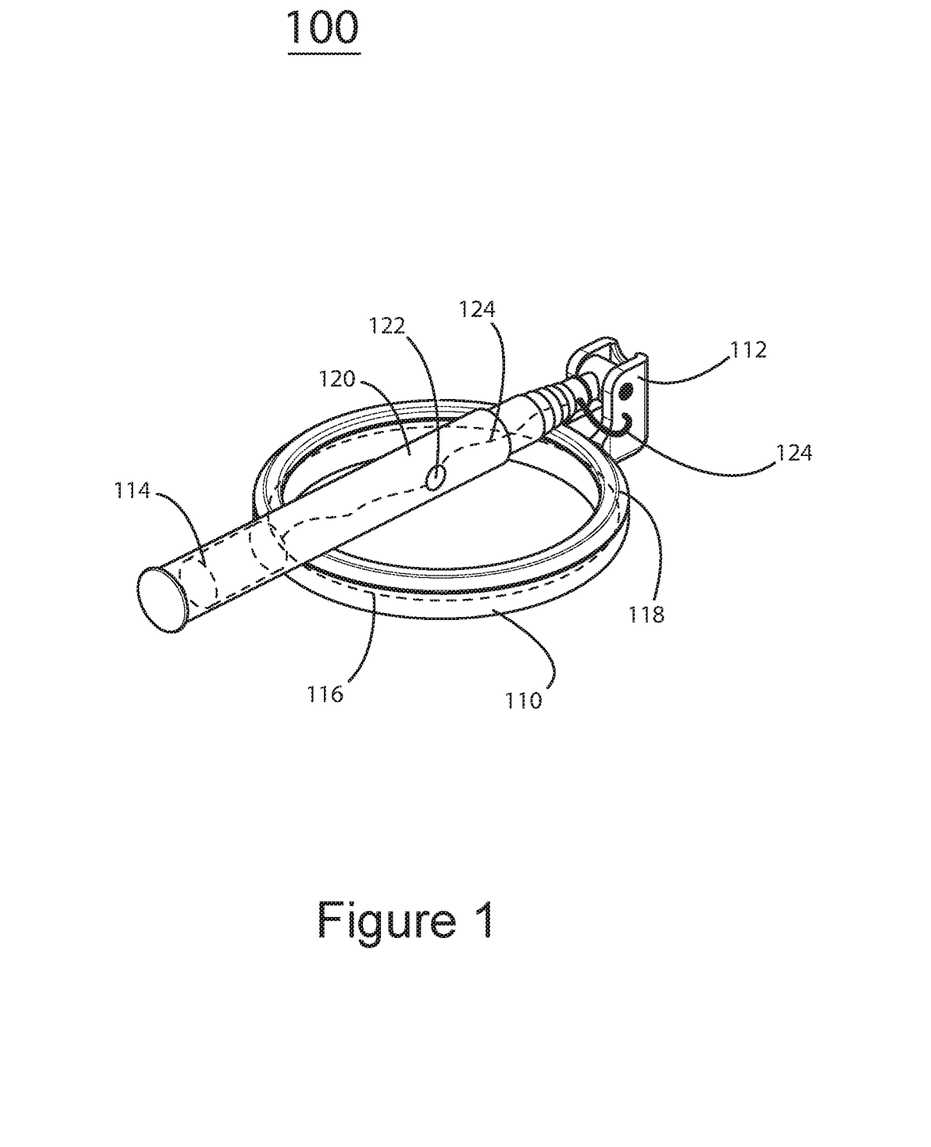
FIG. 1 is a perspective view of an example embodiment of the present disclosure in a folded position.
Figure 2:
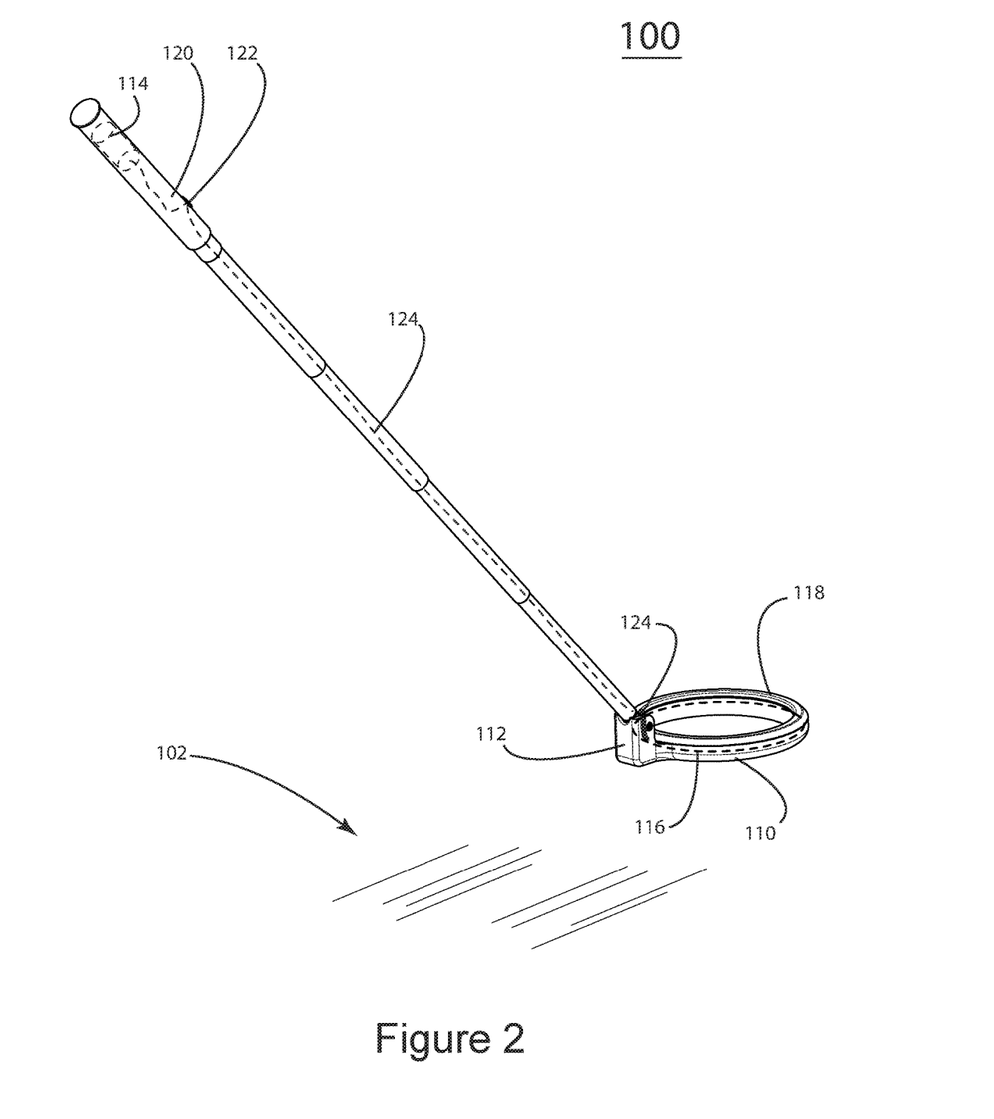
FIG. 2 is a perspective view of the example embodiment of FIG. 1 in an unfolded position.
Figure 3:
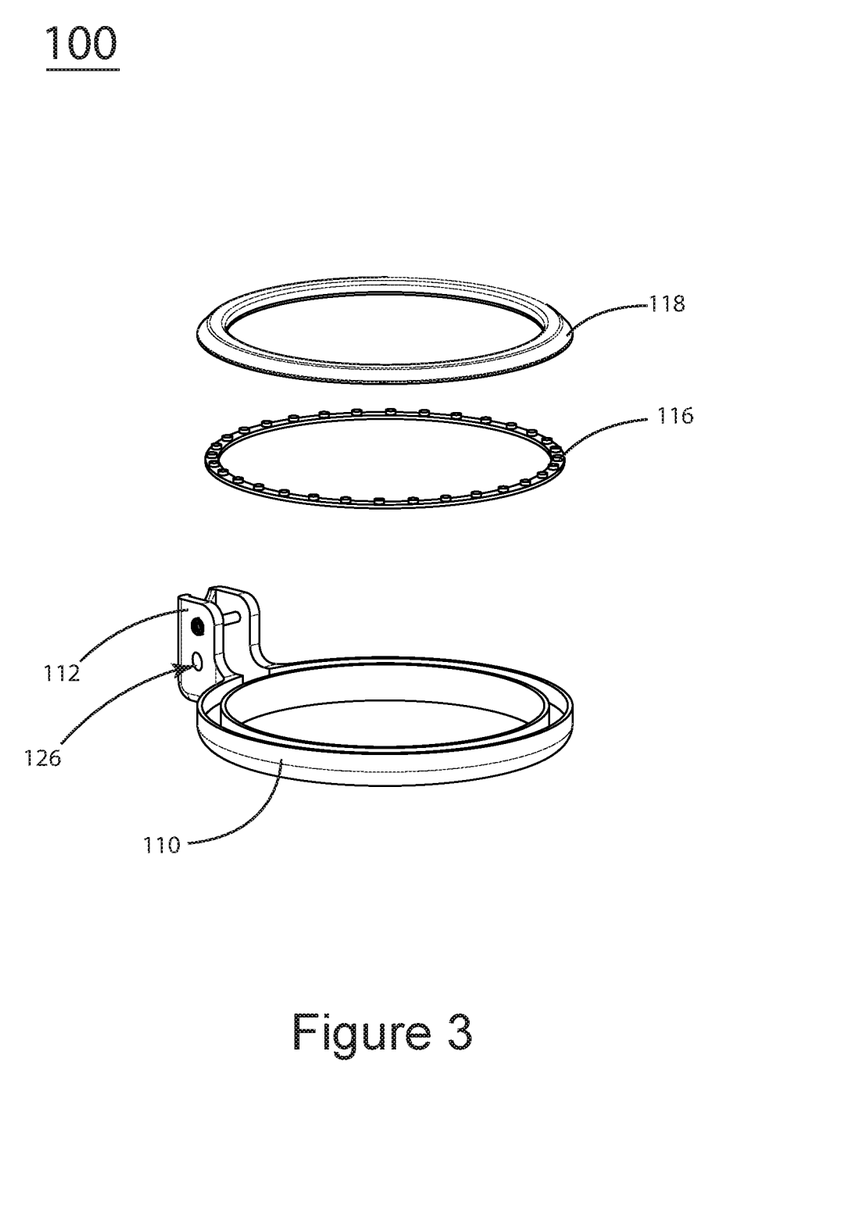
FIG. 3 is an exploded view of the illuminated bag-holding ring of the embodiment of FIG. 1.

FIG. 1, FIG. 2 and FIG. 3 show perspective views of an example embodiment 100. FIGS. 1 and 2 show the embodiment in folded and unfolded configurations (respectively). FIG. 3 shows an exploded view of the ringed bag holder of embodiment 100. A telescoping handle FIGS. 1 and 2, 120 has a switch 122 and a paired wire 124. The paired wire 124 can extend to the length of the telescoping handle in both the open and closed positions. One skilled in the art understands that extendable wires may be coiled, looped or variously configured to avoid pinching during extension/collapsing of the telescoping handle. A ring-shaped housing 110 houses an array of low-voltage lights 116 and a power source 114. An elastomeric-coated lens 118 covers and magnifies the lights, which shine through it. The lens is coated with transparent elastomeric material. The transparent elastomeric material is of a durometer Shore-00 between 0 and 70 and is sufficiently soft to grip a plastic bag when the bag is wrapped over the ring. The elastomeric material grips the bag as it is pulled in a sheer direction over the surface of the lens. When in an open position as illustrated in FIG. 2, the illuminated ringed bag holder is substantially parallel to a ground plane 102.

The paired wire 124 connects a lead wire between the power source 114 and the array of lights 116. A receptacle 126 receives the paired wire 124 for engagement with the power source. When the switch 122 is engaged, the paired wire 124 completes the circuit between the power source and light array 116. With the handle 120 extended, the ringed housing 110 and aforementioned engaged components reside substantially parallel to the ground.

Figure 4:
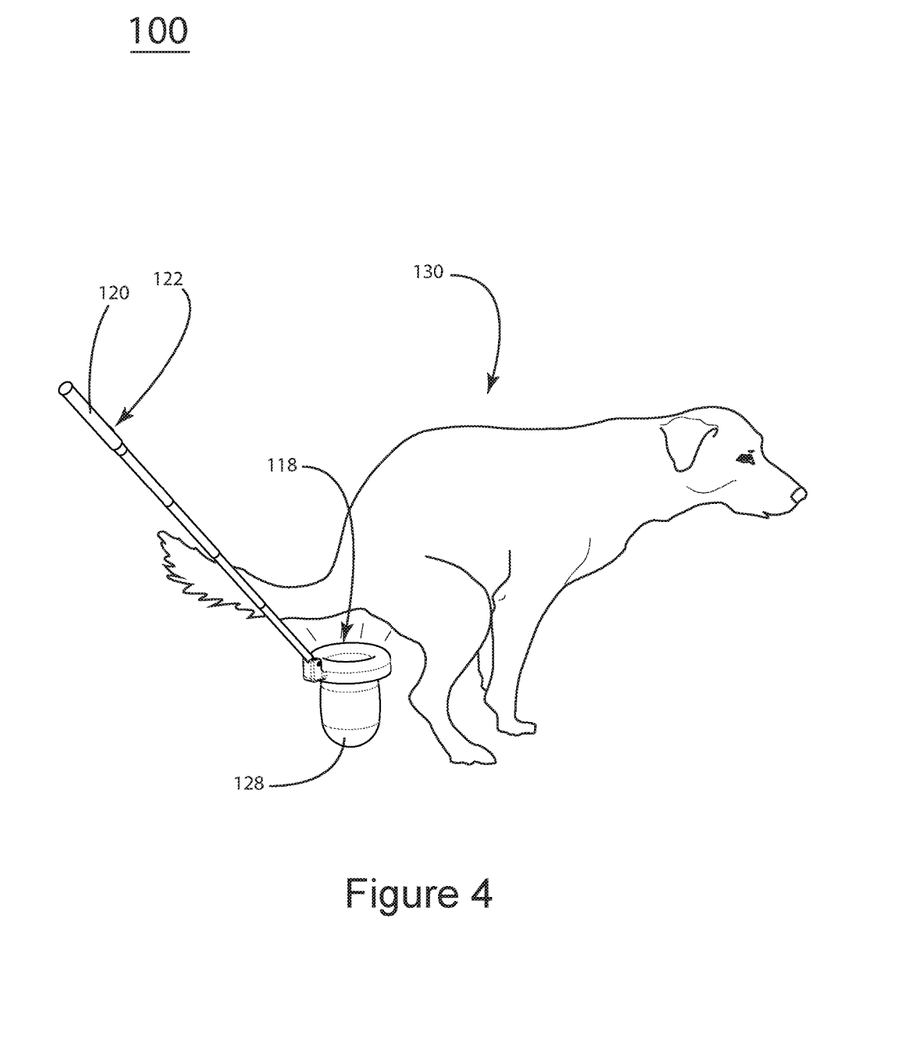
FIG. 4 is an illustration of the embodiment of FIG. 1 as used with a bag in place and the apparatus proximal to a dog.

Referring to FIG. 4 the previously described apparatus is shown in use. A dog 130 is ready to defecate. The handle 120 is extended. The illuminated bag-holding ring 110 holds a bag 128. With the switch 122 engaged the array of lights in the illuminated bag-holding ring 110 illuminate the dog's hindquarters, allowing for proper positioning of the apparatus 100 for collecting waste.

Figure 5:
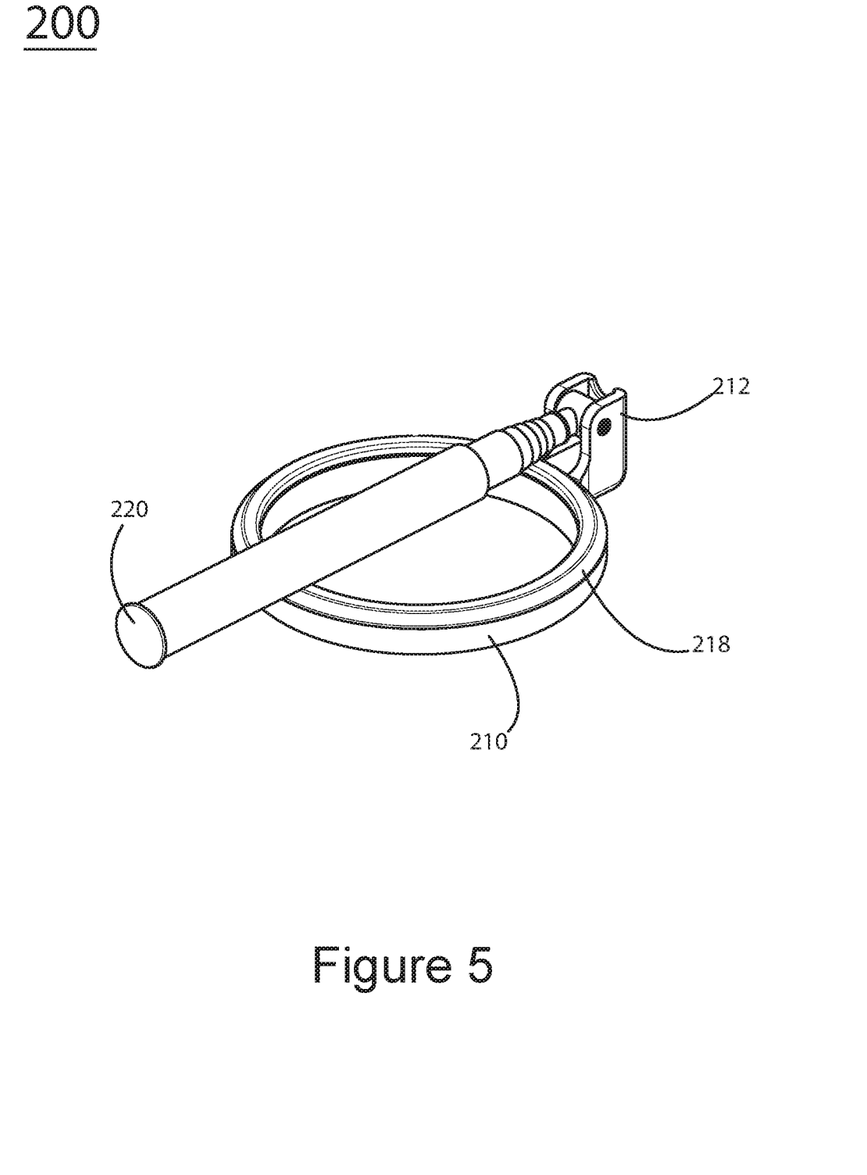
FIG. 5 is an illustration of a second embodiment of the present disclosure.
Figure 6:
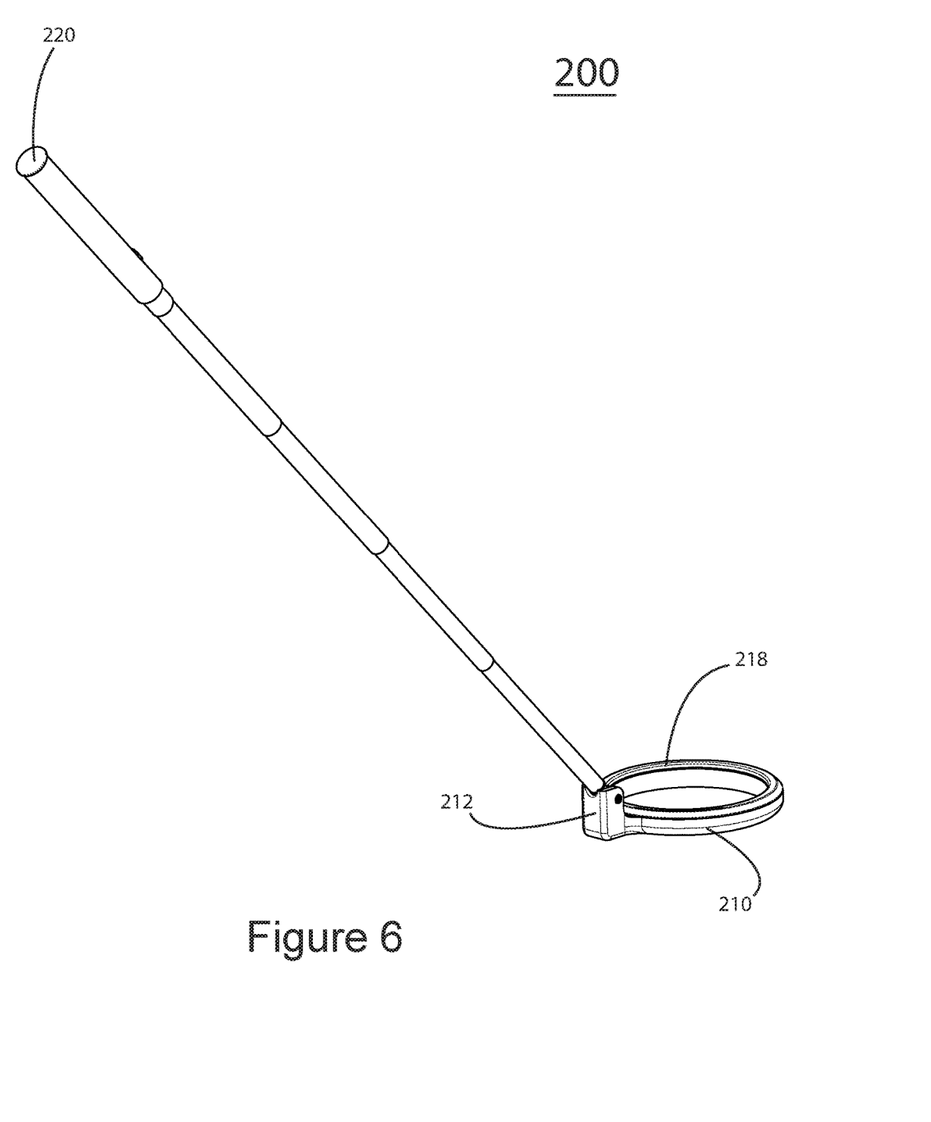
FIG. 6 is a perspective view of the example embodiment of FIG. 5 in an unfolded position.
Figure 7:
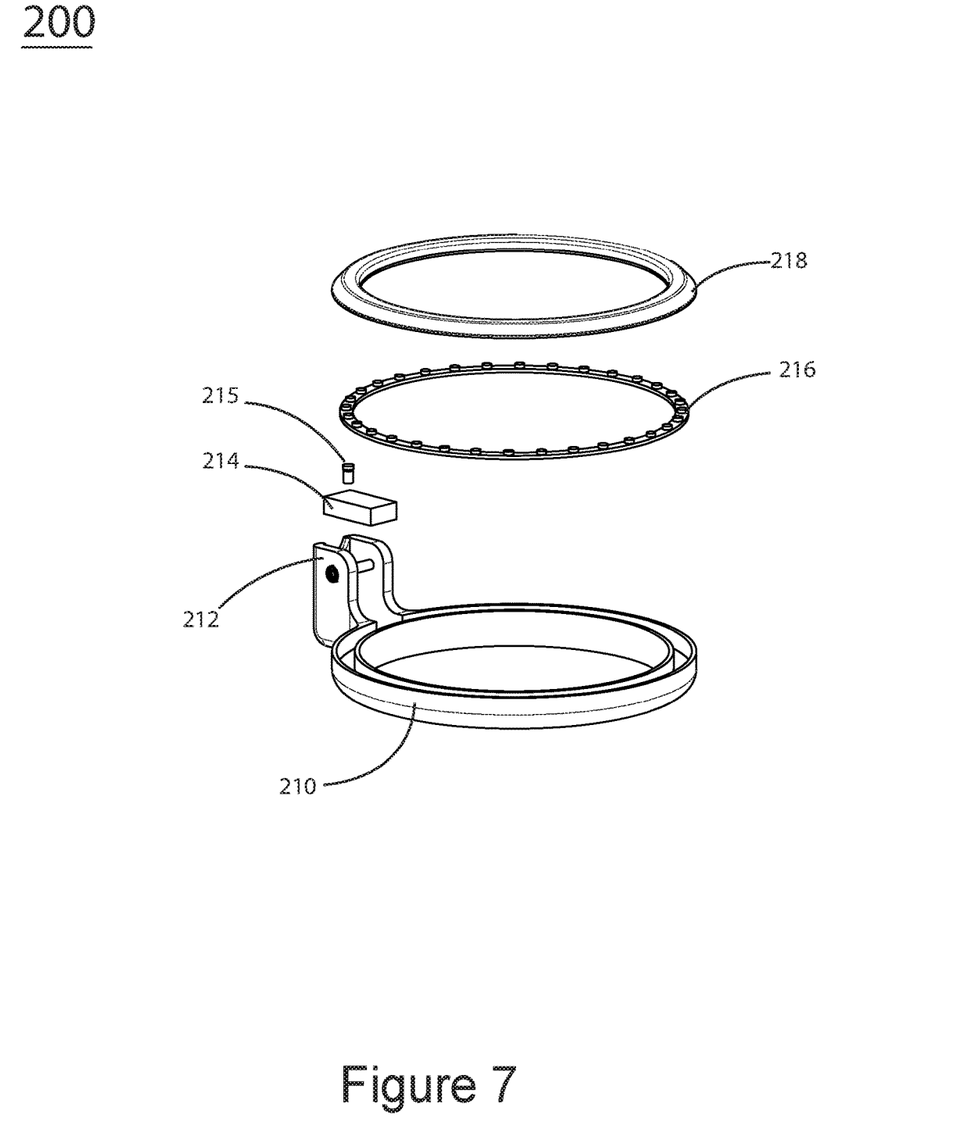
FIG. 7 is an exploded view of the illuminated bag-holding ring of the embodiment of FIG. 5.

In FIG. 5 and FIG. 6, a second iteration 200 is shown folded and unfolded, respectively. An exploded view of the iteration 200 is depicted in FIG. 7. A telescoping handle 220 (FIGS. 5 & 6), folds about an offset hinge 212. A ring shaped housing 210 houses an array of low-voltage lights FIG. 7, 216 and a power source 214. A lens 218 covers a groove in the housing; this lens magnifies the lights 216 which shine through it. A transparent elastomeric material covers the lens 218. The transparent elastomeric material is of a durometer Shore-00 between 0 and 70 and is sufficiently soft to grip a plastic bag when the bag is wrapped over the ring. The elastomeric material grips the bag as it is pulled in a sheer direction over the surface of the elastomeric material. With the handle FIG. 6, 220 extended, the ringed housing 210 and aforementioned engaged components substantially parallel to the ground.

Figure 8:
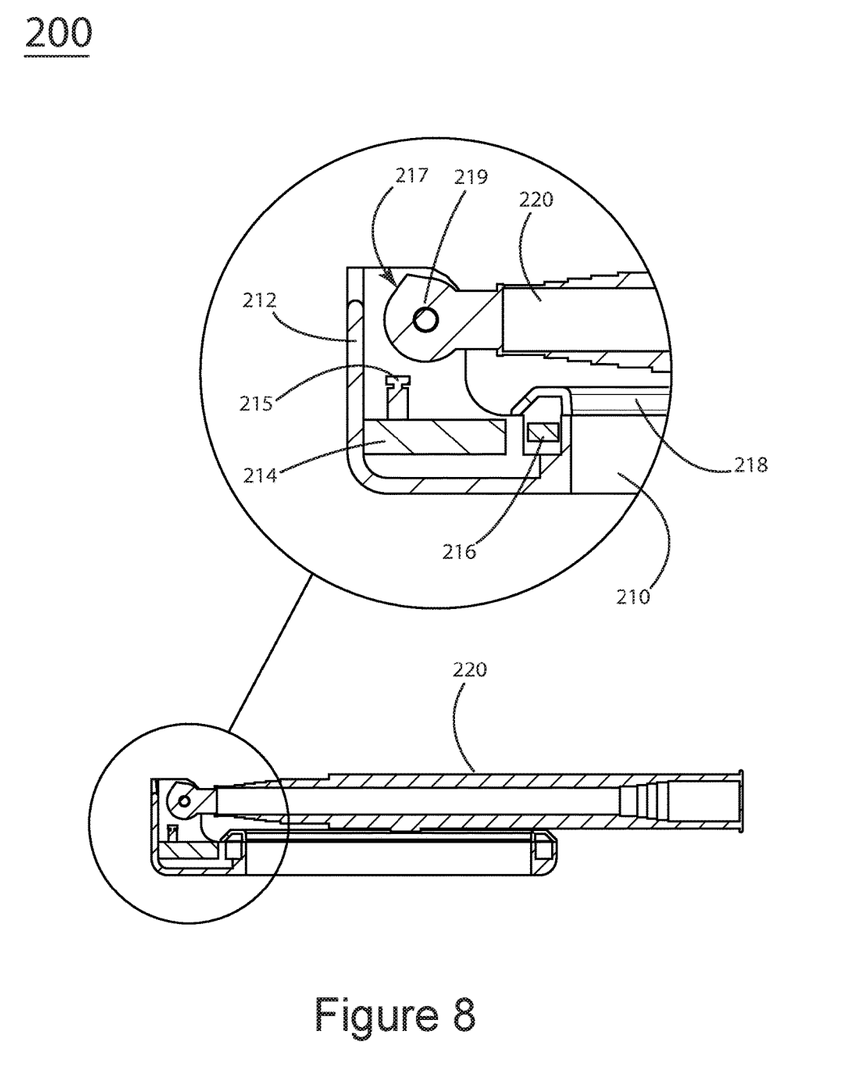
FIG. 8 is a detailed section view illustrating a disengaged switch of the embodiment of FIG. 5.
Figure 9:
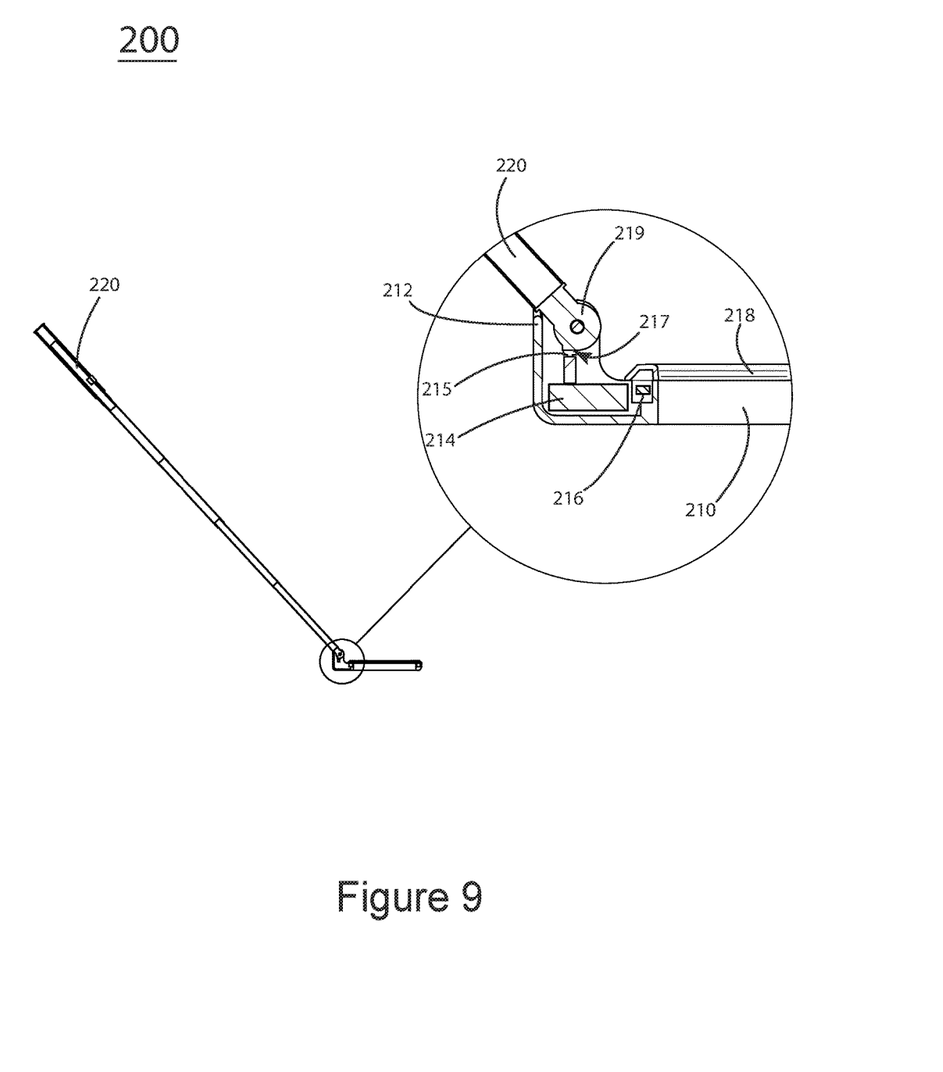
FIG. 9 is a detailed section view illustrating an engaged switch of the embodiment of FIG. 5.

FIG. 8 and FIG. 9 depict the function of a switch engaged with the offset hinge. The distal end of the telescoping handle 220 is a stationary portion of a hinge 219 having a flat section 217 that is tangent to the round hinge surface. The power source 214 and momentary switch 215 are housed within the offset hinge 212. When the switch is engaged it completes a circuit between the power source 214 and the ring of low-voltage lights 216 in the ringed housing 210. The ringed housing 210 has a lens 218 that is coated with an elastomeric material as previously described in embodiment 100.

The detail view in FIG. 9 depicts the switch 215 in the depressed, engaged position. When the telescoping handle 220 is extended and rotated about the hinge 219, the flat portion 217 engages and depresses the switch 215, thus completing the circuit between the power source 214 and the ring of low-voltage lights 216. The low-voltage lights 216 in the ringed housing 210 shine through the lens 218.

Figure 10:
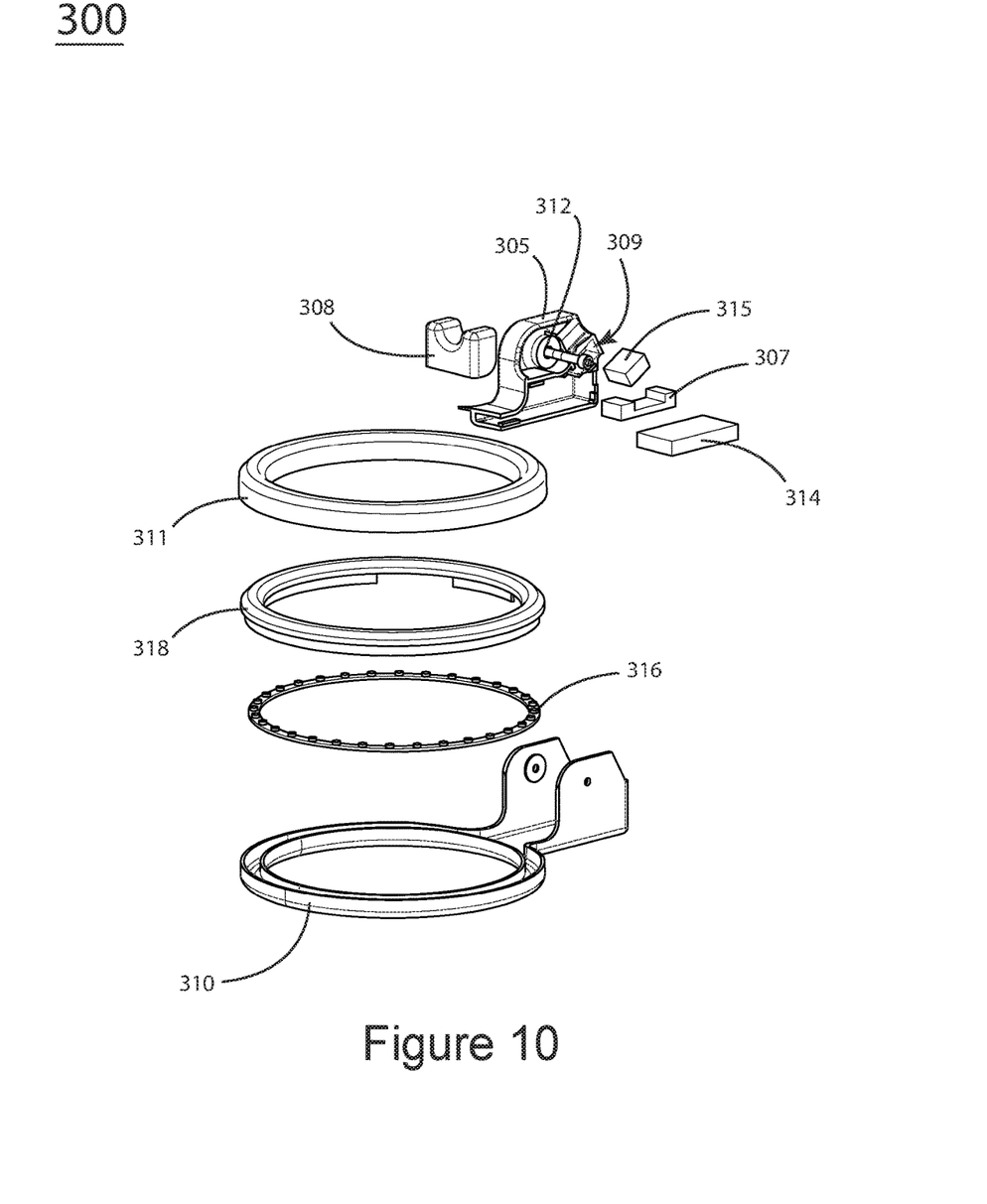
FIG. 10 is an illustration of a third embodiment of the present disclosure.

FIG. 10 shows an exploded view of an iteration 300. A telescoping handle 320 (FIG. 11) folds about an offset hinge FIG. 10, 312. An elastomeric clamp 308 is a flexible form that surrounds the telescoping handle 320 (FIG. 11) when it is closed. A bag may be removed from the ring and clamped between the handle and the elastomeric clamp FIG. 10, 308 for carrying the full bag.

A ring-shaped housing 310 is for an array of low-voltage lights 316. An electronics housing 305 provides a waterproof covering for the switch 315, charge controller 307 and power source 314. A charge port and control circuit 307 controls voltage to the power source 314 for charging. The switch 315 is held in a receptacle 309 in the housing 305. The switch 315 is positioned in the housing 305 such that rotation of the handle depresses a portion of the housing that then transfers the motion to the switch 315 to operate the array of lights 316. One skilled in the art understands that an illuminated ring may also be accomplished with a light source positioned to illuminate the edge of a transparent ring.

A lens 318 covers an opening in the housing that holds the array of lights 316, allowing the light to shine through. A transparent elastomeric cover 311 is affixed to the lens 318. The transparent elastomeric material is of a durometer Shore-00 between 0 and 70 and is sufficiently soft to grip a plastic bag when the bag is wrapped over the ring. The elastomeric material grips the bag as it is pulled in a sheer direction over the surface of it.

Figure 11:
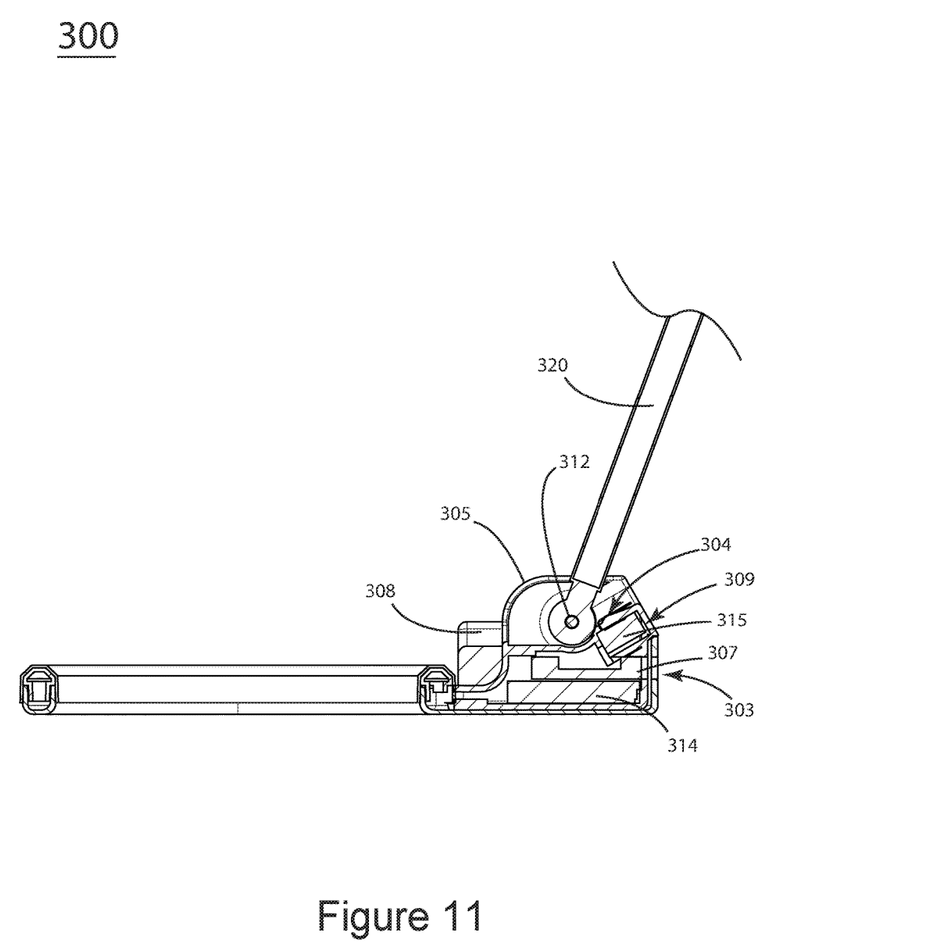
FIG. 11 is a detailed section view illustrating a disengaged switch of the embodiment of FIG. 10.

FIG. 11 is a cross-section view of the iteration 300. The handle 320, shown in partial view, is engaged with the offset hinge 312. A power source 314, switch 315 and controller 307 are contained within the electronics housing 305. The controller 307 has a charge port 303 for connecting the controller 307 and power source 314 to a charger. The switch 315 is mounted within a receptacle 309 such that the switch is proximal to the handle 320 when it is in the open-most position. A portion of the housing 304 is a motion transfer device that is configured to flex when the handle 320 is rotated about the hinge 312 and engages with the motion-transfer device which in turn depresses the switch 315.

One skilled in the art is familiar with means for transferring motion through the walls of a housing to engage a switch while protecting the components within the housing from moisture and dirt. Other means include magnetically engaged switches and the like.

Figure 12:
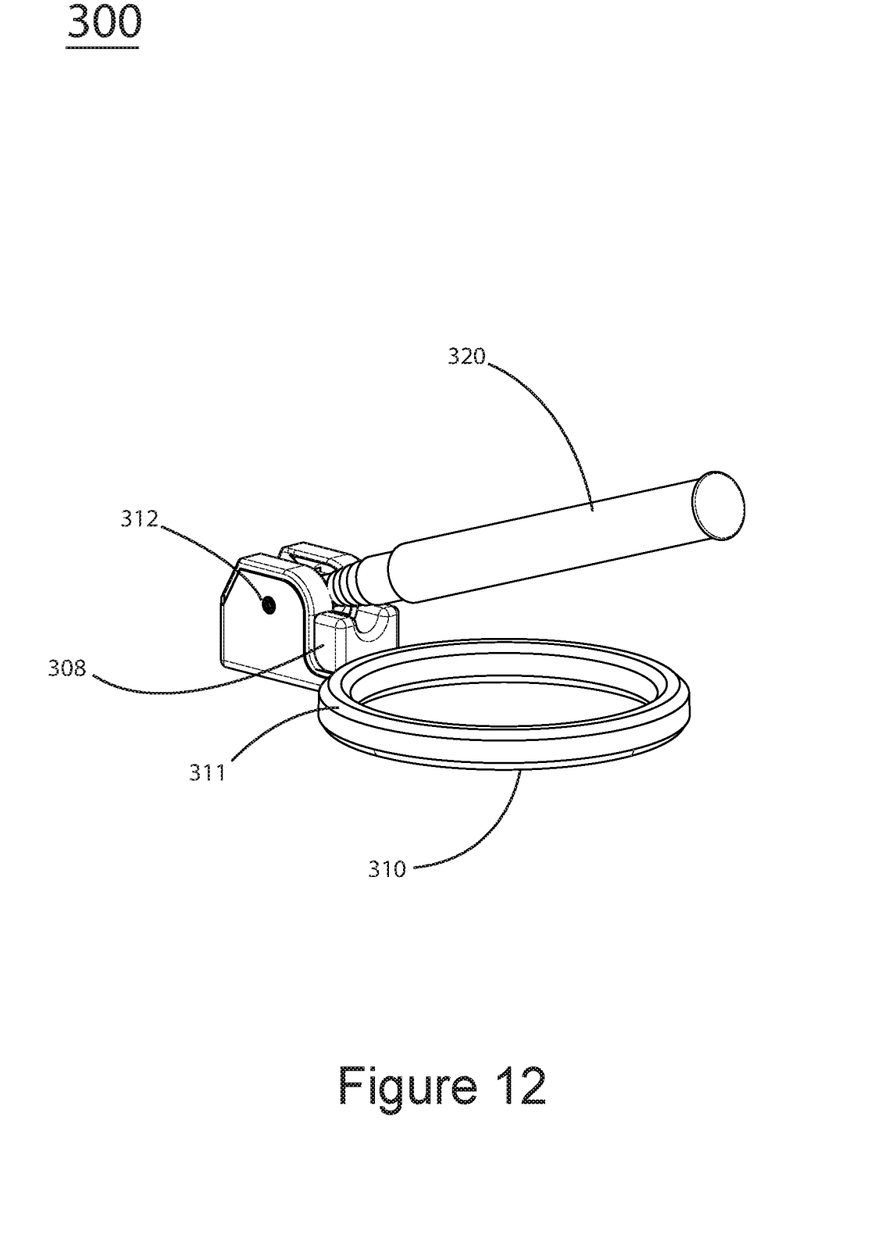
FIG. 12 is a perspective view of the embodiment of FIG. 10.

FIG. 12 shows the telescoping handle 320 approaching the closed position as it is pivoted about the hinge 312. A bag may be removed from the elastomeric cover 311 on the ringed housing 310 and placed between the elastomeric grip 308 and the handle 320 to clasp and hold the bag for carrying.

While example embodiments have been described herein, they should not be construed as limiting. Additions and modifications to what is expressly described herein are included within the scope of the invention. Features of the various embodiments described herein are not mutually exclusive and can exist in various combinations and permutations, even if such combinations or permutations are not made express herein, without departing from the spirit and scope of the invention. For example, one skilled in the art understands that in either embodiment, a power source may be stored in the proximal end of the telescoping handle.

The invention claimed is:

1. An apparatus for collecting pet waste comprising:
   a handle; and
   said handle engaged about a pivot; and
   said pivot supported within an electronics housing; and
   said electronics housing for containing a power source and a switch; and
   an illuminated bag-holding ring fixedly engaged with said electronics housing, further comprising:
      an annular lens; and
      an annular illuminated structure; wherein
   the power source powers the illuminated structure when switched on, such that the illuminated bag-holding ring illuminates the rim of a bag held about the illuminated bag-holding ring for the collection of pet waste when the handle is pivoted about the pivot and held in proximity of the pet while the pet is eliminating waste.

2. The apparatus of claim 1 further comprising:
   a switch fixedly engaged within said electronics housing; and
   said switch electronically coupled with said power source; and
   said power source electronically coupled with said annular illuminated structure; and
   said switch proximal to said handle when said handle is moved to an open position; wherein
   the movement of said handle depresses the switch and illuminates said illuminated structure during use.

3. The apparatus of claim 1 further comprising:
   a flexible clamp engaged with said illuminated bag-holding ring proximal to said handle when pivoted to a closed position; wherein
   said bag may be placed between said flexible clamp and said closed handle to grasp a full bag when carrying.

4. The apparatus of claim 1 wherein
   said annular lens is fixedly engaged with an annular lens cover comprised of a castable elastomer material of a durometer Shore-00 between 0 and 70, for gripping a bag by surface friction as the bag is draped over the annular lens cover.

5. The apparatus of claim 1 wherein said illuminated structure is an annular array of light-emitting diodes.

6. The apparatus of claim 1 wherein said illuminated structure is an edge-lit transparent polymer and wherein said electronic housing further comprises a light source proximal to said edge-lit transparent polymer; wherein
   said light source is directed toward the edge of the illuminated structure and light is transmitted through the transparent polymer to illuminate the illuminated bag-holding ring.

7. An apparatus for collecting pet waste comprising:
   a telescoping handle having a proximal end and a distal end; and
   said telescoping handle, proximal end, having a handle grip containing a power source and a switch; and
   said telescoping handle's distal end is engaged about a pivot; and
   an illuminated bag-holding ring pivotally engaged with said pivot, further comprising:
      an annular, illuminated structure electronically coupled with said switch and said power source; and
      an elastomeric ringed lens cover; wherein
   the switch controls the flow of electricity from the power source to the illuminated structure in the illuminated bag-holding ring which illuminates the rim of a bag held about the illuminated bag-holding ring for the collection of pet waste when held in proximity of the pet while the pet is eliminating waste.

8. The apparatus of claim 7 further comprising:
   a clip for holding said bag for transporting said bag when it is full.

9. The apparatus of claim 7 wherein said annular illuminated structure is an annular array of light-emitting diodes.

10. The apparatus of claim 7 wherein said illuminated structure is an edge-lit transparent polymer and wherein said switch and said power source are further coupled with a light source proximal to said edge-lit transparent polymer; wherein
   said light source is directed toward the edge of the illuminated structure and light is transmitted through the transparent polymer to illuminate the illuminated bag-holding ring.

* * * * *